United States Patent [19]

Bogart et al.

[11] Patent Number: 4,488,004
[45] Date of Patent: Dec. 11, 1984

[54] PROVIDING FEATURE TRANSPARENCY BETWEEN A PLURALITY OF PBXS

[75] Inventors: Frank J. Bogart, Boulder; Mary R. Dedisse, Denver; Radhakrishna S. Divakaruni, Boulder; Charles J. Fette, Parker; Keith S. Knight, Golden; Karen L. Page, Arvada; Thornton S. Paxton, Broomfield, all of Colo.

[73] Assignee: AT&T Bell Laboratories, Murray Hill, N.J.

[21] Appl. No.: 363,421

[22] Filed: Mar. 30, 1982

[51] Int. Cl.³ .................. H04M 3/42; H04M 7/06; H04Q 3/54
[52] U.S. Cl. ..................... 179/18 AD; 179/18 BC; 179/18 ES
[58] Field of Search ........... 179/18 AD, 18 B, 18 ES, 179/18 EA, 18 J, 18 BC; 370/60, 62

[56] References Cited

U.S. PATENT DOCUMENTS 4,021,619  5/1977  Potter et al. .................. 179/18 FC
4,313,036  1/1982  Jabara et al. ................. 179/18 AD

OTHER PUBLICATIONS

"Common Channel Interoffice Signaling (CCIS)", by C. J. Simon, *GTE Automatic Electric Journal*, Mar., 1979, pp. 50–58.
S. Bush, R. Carlsen, I. Lifchus, M. McPheters, "Expanding the Role of Private Switching Systems," *Bell Laboratories Record*, Oct. 1979, pp. 243–248.
K. Crawford, C. Funk, P. Miller, J. Sipes, Excerpt from "Common Channel Interoffice Signaling: 4A Toll Crossbar Application", *Bell System Technical Journal*, Feb. 1978, vol. 57, No. 2, pp. 313–314.
A. Gerrish, D. Opferman, "Development of Electronic Tandem Service (ETS) For The Dimension ® PBX", *Proc. IEEE Computer Society*, Nov. 6–8, 1979, pp. 86–93.

*Primary Examiner*—Thomas W. Brown
*Attorney, Agent, or Firm*—Donald M. Duft

[57] ABSTRACT

An arrangement for according station and attendant feature transparency between independently operational PBXs of a PBX network. Each PBX includes a switch processor, station lines and tie-trunks extending to other PBXs. Each PBX also has a Direct Memory Data Controller (DMDC) for transmitting service or feature related data messages associated with tie-trunk calls to other PBXs over data links. On an interPBX call, the DMDC in a calling PBX transmits a data message to a DMDC in the called PBX over a direct link between the calling and called PBXs. In the event there is no direct link between the calling and called PBXs, the DMDC in the calling PBX transmits a message over a data link to a DMDC at a tandem PBX which, in turn, sends the message over a link to a DMDC in the called PBX. The DMDC in the called PBX processes the received data message and, by direct memory access, sends the message to its switch processor which provides the specified feature or other service required on the call above and beyond the establishment of a voice path connection between the calling and called stations. This arrangement allows interPBX calls to appear to the customers as if they are served by a single large PBX.

46 Claims, 17 Drawing Figures

FIG. 3

|  | 15 14 | | 8 | 7 | 0 |
|---|---|---|---|---|---|
| WORD 0 | SPARE | FEATURE MSG. TYPE # | | SPARE | FEATURE # |
| 1 | INTER-PBX TRUNK INDEX # | | | TRUNK GROUP # | |
| 2 | ABRT_ FLG | SPARE | TERM PBX # | | ORIG. PBX # |
| 3 | SPARE | | 3RD CHAR SRC ICI | | 4TH CHAR SRC ICI |
| 4 | SPARE | | 1ST CHAR SRC ICI | | 2ND CHAR SRC ICI |
| 5 | ORIG. STA./COS | SRC TSK IDX / AT NO. NO. | | SPARE | SOURCE TYPE |
| 6 | D4 | | D3 | D2 | D1 |
| 7 | SPARE | | | | D5 |
| 8 | | | | | |
| ⋮ | | | | | |
| 19 | | | | | |

| REDEF 3 WORD 4 | D4_0 | D3_0 | D2_0 | D1_0 |
|---|---|---|---|---|
|  | SPARE | | | D5_0 |

FIG. 4

| | | |
|---|---|---|
| 0-1 | 201 READ OFST | |
| 2-3 | | |
| 4-5 | | |
| 6-7 | QUEUE | LINK |
| 8-9 | NET. CH. # | PORT |
| 10-11 | | |
| 12-13 | Q FLAGS | |
| 14-15 | RIC | R0 |
| 16-17 | R1 | ADDRESS |
| 18-19 | CONTROL | GFI |
| 20-21 | LOG. CH. # | PTI |
| 22-23 | $SLDH_0$ | $SLDH_1$ |
| 24-25 | $SLDH_2$ | $SLDH_3$ |
| 26 → | DATA | |

SESSION LAYER DATA HEADER (rows 22-25)

FIG. 10

| MESSAGE TYPE | | FEATURE NUMBER | |
|---|---|---|---|
| | | TRK GROUP BETWEEN PBX'S | |
| | TERMINATING PBX | ORIGINATING PBX | |
| CAMP STATUS | DIAL ACCESS CODE AT REMOTE | | |
| BUSY/WARN CTL/LAMP VALUES | HOMING PBX | LAMP VALUE | LAMP/KEY ADDRESS ON ORIG. CONSOLE |
| | ATTND I.D. DOING ACTIVATE/DEACTIVATE | | |

FIG. 11

"INIT-ACB MSG" (TYPE 1)

| WORD # | | | | | |
|---|---|---|---|---|---|
| 0 | 0 | MSG = INIT-ACB | 0 | FEAT. = AUTO CB | |
| 1 | TIE TRK INDEX | | TIE TRK GRP NO. | | |
| 2 ABRT-FLG | 1 | 0 | RCFWR FLG | 0 | ORIG. PBX ID |
| 3 | D4-0 | D3-0 | D2-0 | D1-0 | |
| 4 | 0 | | | D5-0 | |
| 5 | ORIG. STA COS | | 0 | SRC = STA ECTS STA | |
| 6 | D4-T | D3-T | D2-T | D1-T | |
| 7 | 0 | | | D5-T | |
| 8 | 0 | ORIG. AUTO CB ICOM NO. | | | |
| 9 | 0 | | | | |

TYPE 1
- INIT-ACB
- RECALL ACB

DATA CHANNEL FOR THESE (TYPE 1) MESSAGES SELECTED ON BASIS OF TRK. GRP & INDEX OF INTER-PBX VOICE (TIE TRK) PATH.

FIG. 12

"CONFIRM AUTO CB ACTIVATION" (TYPE 2) (CBMSG 1)

| WORD # | | | | | |
|---|---|---|---|---|---|
| 0 | 0 | MSG = CONFIRM ACB ACTIVATION | 0 | FEAT. = AUTO CB | |
| 1 | 0 | | 0 | | |
| 2 | 0 | 0 | TERM. PBX NO. (CALLING) | ORIG. PBX ID (CALLED) | |
| 3 | D4-0 | D3-0 | D2-0 | D1-0 | |
| 4 | 0 | | | D5-0 | |
| 5 | 0 | | 0 | 0 | |
| 6 | D4-T | D3-T | D2-T | D1-T | |
| 7 | 0 | | | D5-T | |
| 8 | 0 | CALLED STA AUTO CB ICOM # | | | |
| 9 | 0 | CALLING STA AUTO CB ICOM # | | | |

TYPE 2
- CONFIRM AUTO CB ACTIVATION
- CALLED STA IDLE
- CANCEL AUTO CB AT ORIG. PBX

- RESTART CALLED STA AUTO CB RECORD SCAN
- CANCE AUTO CB (AT REM PBX)

DATA CHANNEL FOR THESE MESSAGES SELECTED ON BASIS OF PBX ID TO WHICH MESSAGE IS DIRECTED.

[ TERMS "ORIG" & "TERM" ARE DEFINED FOR THE PBX FROM WHICH THE MESSAGE ORIGINATES ]

FIG. 13

INITIATE
CALL WAIT ORIGINATING
CALL TO REMOTE STA

CWOMSG0        LOC→REM

| 0 | 0 | 0 | CW-ORG |
|---|---|---|---|
| TRK # | | TRK GRP # | |
| 0 | 0 | ORIG-PBX | |
| D4-O | D3-O | D2-O | D1-O |
| 0 | | | D5-O |
| ORIG COS | | 0 | ORIG-ID |
| D4-T | D3-T | D2-T | D1-T |
| 0 | | | D5-T |

← STA OR ECTS STA (at ORIG-ID row)

FIG. 14

INITIATE:
STA TO REMOTE STA CALL
ATND ORIG. TO REMOTE STA CALL

RNGMSG0        LOC→REM

| 0 | 0 | 0 | D-RING |
|---|---|---|---|
| TRK # | | TRK GRP # | |
| 0 | 0 | ORIG-PBX | |
| D4-O | D3-O | D2-O | D1-O |
| 0 | | | D5-O |
| ORIG COS OR ATND # | | 0 | ORIG-ID |
| D4-T | D3-T | D2-T | D1-T |
| 0 | | | D5-T |

← ATND. STA OR ECTS STA (at ORIG-ID row)

FIG. 15

INITIATE:
ATND ASSISTED CALL
TO REMOTE STA

MCWMSG0      LOC → REM

| 0 | 0 | 0 | CW-ATT |
|---|---|---|---|
| TRK # | | TRK GRP # | |
| 0 | 0 | | ORIG PBX |
| 0 | | | |
| 0 | | | |
| ATND # | | 0 | ORIG_ID |
| D4_T | D3_T | D2_T | D1_T |
| 0 | | | D5-T |

ATT

FIG. 16

CALL WAIT ALLOWED

ACWMSG 1      REM → LOC

| 0 | 1 | 0 | CW-ATT |
|---|---|---|---|
| TRK # | | TRKGRP # | |
| 0 | TERM PBX(LOC.) | | ORIG PBX(REM) |
| D4_0 | D3_0 | D2_0 | D1_0 |
| 0 | | | D5_0 |
| ATND # | | 0 | ORIG_ID |
| 0 | | | |
| 0 | | | |

ATT

FIG. 17

ATND RELEASED - APPLY
CALL WAIT ALERT TONE

ACWMSG4      LOC → REM

| 0 | 4 | 0 | CW-ATT |
|---|---|---|---|
| TRK # | | TRK GRPH | |
| | TERM PBX(REM) | | ORIG PBX(LOC) |
| 0 | | | |
| 0 | | | |
| ATND | | 0 | ORIG_ID |
| D4_T | D3_T | D2_T | D1_T |
| 0 | | | D5-T |

ATT

PROVIDING FEATURE TRANSPARENCY BETWEEN A PLURALITY OF PBXS

FIELD OF THE INVENTION

This invention relates to communication switching systems and more particularly to networks of private branch exchanges.

BACKGROUND OF THE PRIOR ART

The common carrier direct distance dialing (DDD) network continues to provide most of the telephonic communication capability for both individual and business customers. As described in the article entitled "Common Channel Interoffice Signaling" (CCIS) in the February 1978 issue of *The Bell System Technical Journal*, signaling for interoffice call set-up and take-down in the DDD network can be delegated to a common signaling link. Separation of the signaling from the voice channel and flexibility in the assignment of message formats on the CCIS network permits evolution and changes to the DDD network to be made at moderate cost. Also, CCIS provides faster interoffice call set-up and take-down.

In the CCIS network, a central office is provided with an access link to a signal transfer point (STP) and the STP in one region is connected to other STPs in each neighboring region. The STPs are provided in the CCIS network in order to permit non-associated signaling, i.e., the exchange of signaling information between offices not directly connected by a CCIS link. In addition to call set-up and take-down, information for network management such as alternate routing priorities, etc. may also be carried by the CCIS trunks. The use of common channel interoffice signaling reduces the holding time of the associated toll trunks, reduces post dialing delays and permits the implementation of an ever-growing number of new telephonic services.

Many large business enterprises today have a number of private branch exchanges that rival the common carrier public switched (DDD) network in the extent of geographical dispersion. Also, some branch exchanges challenge the size and complexity of central offices in terms of the number of features, trunks and stations served.

As the communication needs of a business organization expand, it becomes desirable to transcend the specific switching limitations of each individual PBX so that users served by a group of physically separate PBXs may be given the same calling privileges as if they were served by one large PBX. It is advantageous not only to connect together geographically dispersed PBXs without resorting to the common carrier DDD toll network but also, to provide a uniform numbering plan for all locations, network cost control features, such as automatic alternate routing and off-hook and ringback queuing to accomplish an efficient and least cost routing. A corporate PBX network achieving some of these goals is described in the articles entitled "Expanding the Role of Private Switching Systems"; *Bell Labs Record*, Vol. 57, No. 9, October 1979, pp. 242-248, and in "Development of Electronic Tandem Service (ETS) Features for the DIMENSION PBX", *Proc. IEEE Computer Society*, Nov. 6-8, 1979, pp. 86-93.

While the electronic tandem PBX network certainly represents an improvement in the ability to link together individual PBX's, it is not feasible to transport all types of feature-related or call-related information by using tandem tie-trunks primarily due to signaling limitations and data transfer rates. Transmitting such information over the trunks would impose a significant workload on the common control processors of the PBX nodes.

U.S. Pat. No. 4,313,036 issued to M. D. Jabara et al on Jan. 26, 1982, proposes a scheme that provides both a voice network and a packet network between computerized branch exchanges for the serving of interPBX calls. A first PBX interrogates a second PBX over the packet network to determine the busy/idle status of a called station at the second PBX. The second PBX returns the busy/idle status of the called station to the first PBX via the packet network and if that station is idle, it reserves that called station at the second PBX for serving the call when it is extended by the first PBX. The originating PBX, in essence, "looks ahead" to determine if the called station is available in the second PBX and provides a connection via the voice network following such a determination.

It might appear that Jabara et al's arrangement provides a satisfactory solution with respect to linkages between PBXs. However, this arrangement does not provide service or feature transparency. In Jabara et al, no information is exchanged following a connection set-up between co-located or geographically dispersed PBXs. This precludes any implementation of the features or services found in a single PBX system. Therefore, the customer having dispersed PBXs as in Jabara et al, would not perceive the plurality of PBXs operating as a single entity when a particular feature or service is required.

It might at first blush appear that the provision of interPBX, CCIS-like links could contribute a similar flexibility of service offerings to a corporate PBX network as are achieved between central offices in the common carrier DDD network. This approach would require a dedicated link between each control processor located in each communicating pair of PBXs. In the common carrier networks, the dedicated high cost CCIS links can be economically justified for public switching because of the heavy volume of offered traffic. In a private PBX network, however, the volume of traffic offered to a PBX CCIS-like link would likely be much lower than that in the public network.

The presence of STPs in the CCIS network reduces the number of direct links required between the COs. The inclusion of STP-type switch units into a group of co-located or geographically dispersed PBXs might, perhaps, appear to address the issue of cost since the number of links between PBXs would be reduced. However, the STPs are expensive switching units that merely act as relay points for the transfer of data. Also, the STPs provide no processing capability with regard to receiving the call stimulus, formatting data with respect to call stimulus, determining the appropriate destination and other such data processing operations necessary for establishing an interPBX call connection in a transparent manner.

A perplexing problem, then, is how economically to implement CCIS-like links in a private PBX network without incurring the expense of providing direct links between all of the PBXs or the expense of providing a network of STP facilities. The use of data links between PBX switching nodes would permit the interchange not only of the same kind of information exchanged over CCIS links between central offices (trunk signaling, traveling class marks, called station supervision, etc.) but also of any additional information that might be of especial utility to the particular corporate network PBX customer, for example, feature-related, call-related, station-related and location-related information.

For example, the PBX attendant at a given PBX node can usually quite easily be provided with a lamp display to indicate the condition of any group of stations or trunks directly terminating in the given PBX where the attendant is located. However, it has heretofore not been economically attractive to provide facilities that would permit the condition of stations or trunks of another PBX in the network to be displayed.

Where a PBX customer has a greater number of telephone stations in a given locality than can be served from a single PBX, it is sometimes desirable to serve such a customer by a plurality of PBXs which together, have the required station capacity. It is then desirable that the plurality of PBXs appear as a single PBX to the users. In other words, the plurality of PBXs are transparent to the users and appear as a single PBX. Accordingly, transparency may be defined as the provision of a service feature in such a manner that the user can perceive no differences occasioned by the need to physically distribute circuits or control. Transparency is also desirable for the plurality of PBXs comprising a multi-location PBX network.

It is accordingly a goal of the present invention to provide full feature transparency among geographically dispersed or co-located PBXs, including features requiring call set-up or completion within specified time limits.

BRIEF SUMMARY OF THE INVENTION

In accordance with the principles of our invention, an embodiment is provided in which co-located or geographically dispersed operationally independent PBXs are connected via a data network that provides full feature and service transparency on interPBX calls. The network appears functionally as one single large PBX to the customer. Each PBX includes typical PBX facilities including a switch processor and tie-trunks extending to the other PBXs for use on interPBX calls. These tie-trunks comprise a voice network over which voice connections between PBXs are made. The voice network carries information (such as switch hook status and dialed digits) necessary to establish a station to station interPBX call. A data network is also provided to carry additional information necessary for transparency and indicative of a customer's selected feature or service.

A station to station call on the voice network may be established independently and separately from the data network. If the data network fails the call may still be established over the voice network. The interPBX data network comprises data paths interconnecting the various PBXs and an intelligent data interface unit, termed a Direct Memory Data Controller (DMDC), located at each PBX and in operational coordination with each PBX. Each DMDC has a plurality of ports or links. For this example assume five. One link connects the DMDC to the switch processor in its associated PBX. The other four links connect the DMDC to separate paths extending to other PBXs of the data network. Some PBXs are interconnected by direct links. Others are only interconnected by a tandem connection: a link from a first PBX connects to a DMDC at a tandem or second PBX, which in turn connects to a link to a third PBX.

The DMDC is a microprocessor based unit which provides a highly efficient I/O capability. A single DMDC may communicate over the first DMDC link to either its associated switch processor or to another DMDC in the PBX network over the other DMDC links. This arrangement permits communication between the switch processors of each PBX in the network. To establish calls transparently and to respond to the customer's selection of a feature, call processing software transfers call control information in the form of messages between the PBXs. These messages are structured to provide feature transparency during call processing. The user perceives the independent PBXs to be the operational equivalent of a single large PBX.

Call-related information, feature-related data, station restrictions and originating PBX related information are transmitted in the form of messages over a data network having links connecting the PBX switching nodes of a private PBX network without necessarily providing direct data link paths between each originating and terminating PBX switching node. THe messages permit such attendant-related features to be transparently provided as: (a) the display of calling number and class of service; (b) the identification of an incoming call's trunk group; (c) the according of any attendant, regardless of location, of access to all routes in the network so that the attendant can control trunk access by stations and so that stations attempting to access certain trunks will be intercepted and diverted to the attendant who can complete the call as desired; (d) the busy verification of any station line; (e) the provision of automatic circuit assurance (ACA) so that whenever a trunk exhibits abnormally long or short holding times an attendant will automatically be summoned and the trunk ID displayed so that the attendant can take appropriate action including the placing of a call to verify the state of the trunk; (f) the identification of any outgoing or other type of trunk; and (g) the ability of the PBX user to perform trunk verification by dialing an access code-like number and the trunk ID; (h) provision of circuitry to permit the attendant to provide call waiting service (camp-on) for an attendant completed call; and (i) permit the attendant to activate call forward-all calls or busy/don't answer for stations.

In addition to the foregoing transparent attendant services, a variety of station-related features may be transparently provided between PBXs including call-waiting, 3 way conference, -transfer, call-forwarding, last station called, station DSS, and automatic callback.

It is an aspect of the present invention that the majority of the foregoing service features may be implemented with a basic set of data messages which comprises the following data or information:
(a) the trunk group and trunk number to be used for an interPBX call and for which a channel assignment exists on the data link;
(b) the called station code at the other PBX;
(c) an identification of the originating source as a station, a trunk or an attendant;
(d) the originating attendant's or station's number;
(e) the ID code of the PBX from which the data link message originates;
(f) a code specifying the action to be taken by the receiving PBX node; and
(g) a parameter indicating the delay tolerable in completing the call. (This parameter is used n determining the data message routing.)

The foregoing messages may be sent over the data link from a PBX node "A" to a PBX node "G" via a node "B" without any direct link between nodes "A" and "G". When the messages sent over the data link refer to a call, the trunk group and trunk number associated with the call are transmitted over the data link so that non-associated signaling may be implemented; i.e., there need be no direct data link between the switching nodes between which a voice communications connection is to be established.

Tandeming in the data link network allows for intercommunication between co-located or geographically dispersed PBXs without resorting to direct links between each pair of PBXs or without requiring an STP type arrangement as in the CCIS system. As previously described, a pair of PBXs may communicate with one another through an intermediary or tandem DMDC unit by a connection of two separate links. The data network carries data messages from an originating PBX to a terminating PBX over direct data links when they exist. When there is not a direct link between the DMDCs in the originating and terminating PBX, the data message is routed through a DMDC at an intermediate PBX. Each DMDC on the connection performs the processing required to facilitate the transmission of the data message to reach the terminating PBX. The DMDC in the originating PBX receives the data message from its switch processor, formats it, interprets it and extends the data message to the terminating PBX by high speed routing through an intermediary DMDC. The intermediary DMDC routes the data message independent of the intermediate PBX's switch processor. Therefore, any intermediary DMDC may be used for routing since the switch processor of the tandem PBX is not involved in processing the data message and routing it to a desired destination. This prevents the switch processor of the tandem PBX from becoming overloaded and therefore, slower and less efficient in its normal call processing capabilities.

The described arrangement provides an appearance to the customer that a call is served by a single large PBX, rather than several independent operational PBXs, i.e., feature transparency. With respect to attendant features, a single attendant can monitor co-located or geographically dispersed operationally independent PBXs from one central location. The need for an attendant for each PBX network is eliminated. This provides an economic benefit for the PBX network customer.

BRIEF DESCRIPTION OF THE DRAWINGS

The foregoing and other objects and features of our invention may become more apparent when the ensuing description is read together with the drawing in which:

FIG. 3 shows a message buffer, in the switch processor memory, for data to be transmitted over the data link for an associated voice call;

FIG. 4 shows a packet buffer in the DMDC processor memory;

FIGS. 10 through 17 show details of messages for specific types of applications.

GENERAL DESCRIPTION

Figure 1:
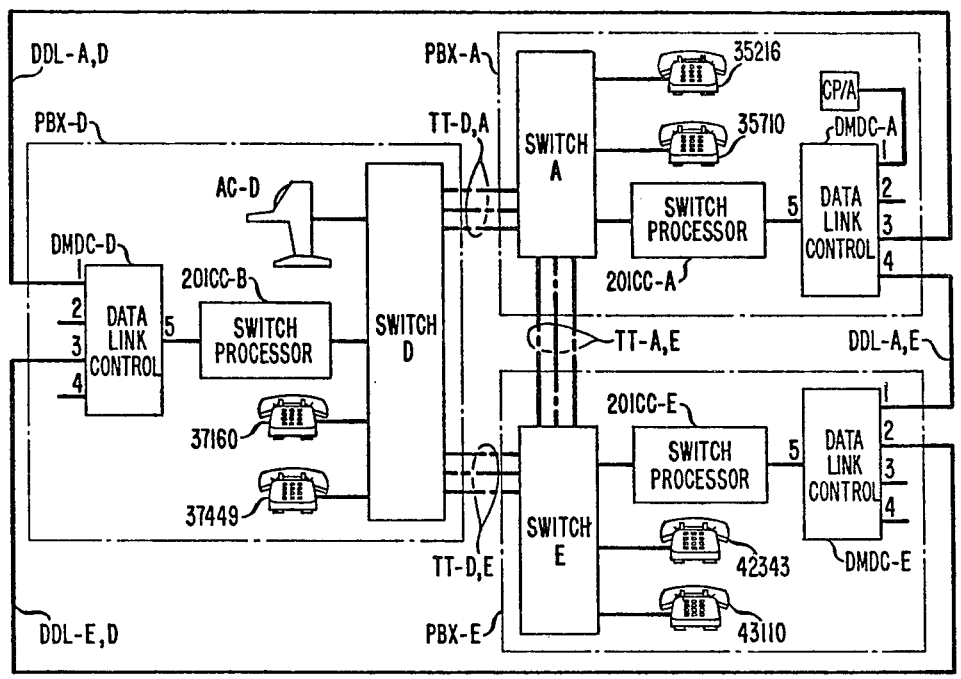
FIG. 1 is a segment of a corporate PBX network showing three PBXs linked by tie-trunks and the ring-like data link network of our invention.
Figure 2:
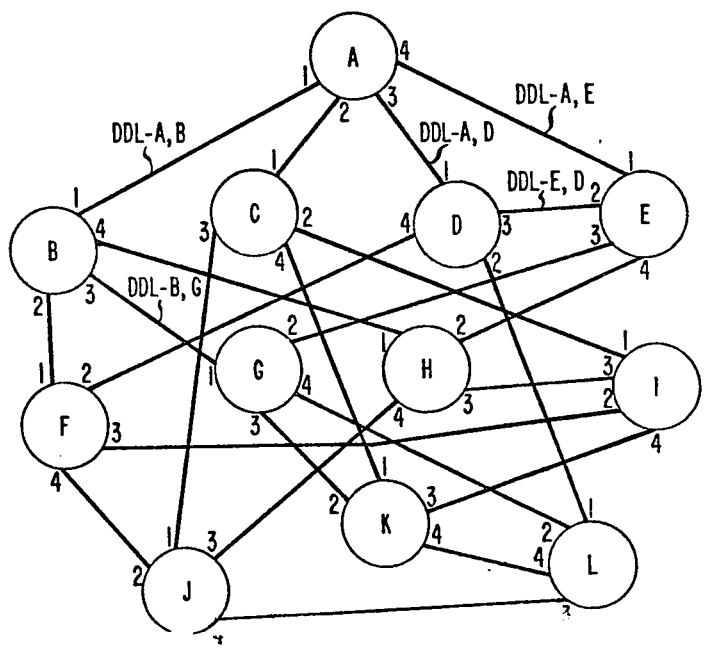
FIG. 2 shows an illustrative ring-like data link network which permits the interchange of packetized control information among twelve geographically dispersed PBX switching nodes with no more than four data link ports at any node.

Referring to FIG. 1, a schematic diagram of a portion of an improved corporate switching network is shown as comprising three PBXs, -A, -D and -E. Each PBX in the network has a respective switch processor 201CC for administering an associated switch and its interPBX tie-trunks TT-. In addition, the switch processor is connected by a link 5 to a data link control unit DMDC which provides packet switching access to a group of packet switching data links DDL- which interconnect all of the PBXs (-A, -D and -E). The DMDC operates like a packet switch and supports virtual call circuits among the PBX's via the links. The data link control (DMDC-A) of PBX-A also has data link access by link 1 to an attached peripheral processor CP/A. Applications programs residing in the switch processor of any PBX node may "talk" to peripheral processor CP/A via packet switching data links DDL- and data link control DMCA-A link 1.

Each PBX serves a plurality of lines terminating in telephone sets or other user equipment. Station lines may be assigned three- to seven-digit extension numbers where all or part of the number is used to route a call intended for that station to the proper PBX. For example, all stations in PBX-A might begin with the digits "35" and "36", those in PBX-B might begin with the digits "37", and those in PBX-E might all begin with the initial digit "4". The centralized attendant console AC-D, for the corporate network depicted in FIG. 1, is connected to PBX-D.

In the illustrative embodiment, each data link control unit comprising a DMDC administers five links, as shown on FIG. 1, with link 5 being the interface for exchanging information with its associated switch processor 201CC. Each link comprises a physical conductor path which uses multiplexing techniques to provide a plurality of virtual communication paths termed logical channels. In the presently disclosed embodiment, each link supports 20 channels. Logical channels are fully defined in the BX.25 protocol specification described in the Bell System Technical Reference PUB 54001 available from the Manager-Information Systems Planning, American Telephone and Telegraph Company, Piscataway, N.J. 08854.

Each DMDC is supported and administered as a peripheral to its associated 201CC switch processor. Each data link control unit (DMDC) has direct memory access (DMA) to the memory portion (not shown) of the associated switch processor 201CC. Link 5 to the DMDC is implemented via the DMA in the following manner. A portion of the switch processor memory is advantageously segmented into m "mail box"-like areas (m=20 in the present disclosure). Each of the m mail boxes has an incoming and outgoing slot for incoming and outgoing messages to and from its DMDC. The m mail boxes are directly mapped to m logical channels of data link 5 administered by the DMDC. The DMDC scans the m mail boxes in the switch processor memory for messages from the switch processor. Messages to or from the logical channels of the data link 5 are placed directly (DMA) into, or taken directly from, the mail box respective to each logical channel in the switch processor memory by the DMDC.

In the illustrative embodiment, each one of the data links 1-5 may carry twenty multiplexed logical channels. The logical channels of data links 1-5 may be associated with each other by what may be termed a "network channel" in the DMDC in such a manner that a packet incoming over one logical channel of one link may be dispatched to another logical channel of another link. The interconnection of two logical channels of different links is accomplished by the assignment of a network channel to the interconnection. In the illustrative embodiment, each DMDC is capable of making twenty network channel associations at any time. Data links 1-4 in the illustrative embodiment operate at a rate of 19.2 kbits per second providing the DMDC with a total bandwidth of four times 19.2 kbits per second in each direction.

The messages that are required to be passed over data links DDL- between PBX nodes may relate either to time-critical features involving the holding of tie-trunks or the need to operate one or more PBX node switches (call-related features) or to non-call special features such as detailed recording of PBX usage (SMDR).

When a data link message involves the setting up of a tie-trunk call from an originating to a terminating PBX, the switch processor of the originating PBX formulates a message. This message (typical format shown in FIG. 3) contains the appropriate information to allow the remote or terminating PBX to complete that part of the call. A typical application would involve sending a data message indicating the source of an interPBX tie-trunk call to the remote PBX node so that the remote PBX can apply distinctive ringing to indicate whether the call source was a station or a trunk.

The tie-trunk group number (p) and the tie-trunk number (q) as identified by the dialed number at the calling PBX node determine the originating PBX switch processor mail box area into which the message is placed. At the same time, software in the switch processor at the originating PBX adds a four byte header (session layer header of BX.25 protocol) which contains a message sequence number, message length and header identifier.

When the DMDC, scanning the switch processor mail box area, detects the presence of a message to be transmitted, the message is read into a DMDC buffer area in the DMDC memory. At the same time, the DMDC adds three more bytes of header information. This is the level 3 header defined in the BX.25 specification. A logical channel number is placed in the header which is associated with the mail box area from which it was read. Software in the DMDC looks at the level 3 header and determines, based on the originating link and logical channel number, the link and logical channel over which the message will be transmitted. This pairing of source and destination links and logical channels, together with the software structures associated with the receiving and sending of level 3 packets, defines a network channel which was previously defined.

Once the destination link and logical channel has been determined, the received level 3 header is modified by the DMDC to reflect the destination logical channel number and the packet is passed to the BX.25 level 2 software in the DMDC.

This software adds two more bytes of header (defined in the BX.25 specification) and transmits the resulting frame to the link. DMDC hardware adds a two byte cyclic redundancy check sequence (FCS in the BX.25 specification) as the frame is transmitted. At the receiving DMDC of the other PBX, the reverse procedure is followed resulting in the message being placed in the appropriate mail box in the remote switch processor memory. Software in this remote switch processor, scanning the incoming mail boxes, detects the presence of the message, interprets and strips off the remaining two words of the header (note that the rest of the header information has been interpreted and stripped off in the receiving DMDC prior to the message being placed in the switch processors memory) and passes the message to the appropriate application software. The message at this point is identical to the message originated by the companion application software at the originating switch processor.

It should be noted that, at the receiving DMDC, had the destination link been other than the switch processor (link 5) at the receiving PBX, the message would have been retransmitted on another data link to another PBX resulting in a "tandem" data message switching operation.

The DMDC pairs one link and logical channel with another link and logical channel by an entity called the "network channel," i.e., the DMDC has a network channel associated with each communications path between the logical channels. The network channel provides buffering and message handling to logical channels at either end. By providing "n" network channels in the DMDC, "n" simultaneous connections between channels of different links can be supported at any given time. Data from one channel of one link can be switched to another channel of another link without involving the PBX switch processor. Accordingly, the DMDC can operate as an intermediate or tandem node to switch control messages between two other PBXs.

Inasmuch as the DMDC of an intermediate PBX has the capability of switching data on a tandem basis to a destination PBX using logical communications paths, there is no need to connect all DMDCs of each of the PBXs directly. However, to keep the message transmission delays within an acceptable range of call handling times of the call processing software, it is convenient to restrict message routing involving call processing messages to at most one intermediate DMDC "hop" (tandem point) before reaching the destination. Messages not involving the setting up of the tie-trunk connections in which time constraints are important, such as those related to the support services such as traffic monitoring, detailed billing, file transfer, etc., need not obey the "one-hop" constraint.

In the illustrative embodiment, the packet switch data link control unit DMDC comprises an Intel 8086 processor having a 128K RAM and a 32K ROM. The operating program, including on-line maintenance, administration and initialization software, resides in ROM. RAM is provided for data buffers, translation data and status data. An Intel 8259 Programmable Interrupt Controller provides eight levels of interrupts and an Intel 8253 Programmable Interval Timer provides for the generation of two independent baud rates for the DDL-data links and for the generation of a 10 millisecond interrupt which is used for software timing. Four Intel 8273 SDLC/HDLC protocol controllers are used to control the four data links DDL- at each node to realize a portion of a "level 2" protocol of the type identified in CCITT recommended X.25. Each protocol controller interfaces to the 8086 memory via two direct memory access (DMA) channels. (Two Intel 8237 Programmable DMA Controllers provide a total of eight DMA channels for the four protocol controllers.) One of these channels is used to receive data and one is used to transmit data. An interrupt is provided to the 8086 at the end of each received message and at the end of each transmitted message.

The 8086 processor has DMA access to the 201CC memory via an I/O operation within the DMDC. A memory protection register under the control of the DMDC is provided to guard against wild writes into the 201CC memory.

DETAILED DESCRIPTION

FIG. 3 shows the generalized contents of the switch processor message buffer for messages having words 0-19 sent over a data link between PBX nodes. A message buffer is a block of memory in the 201CC switch processor for storing received messages and messages to be transmitted to its DMDC. Message word 0 and word 2 are contained in all messages. Word 0 identifies the special service feature number and type, word 1 identifies the interPBX tie-trunk group and trunk index number, word 2 contains the originating and terminating PBX numbers and a "spare" field which may be employed for a remote call forwarding flag as elsewhere described herein, and words 3 and 4 may contain either the originating source identification of station digits or may be redefined for attendant or source trunk group identification. Word 5 contains a type of source identification, e.g., whether ordinary or ECTS station, private network trunk or public network trunk, originating station class of service, source trunk index and attendant number and words 6 and 7 contain the terminating station digits.

Figure 5:
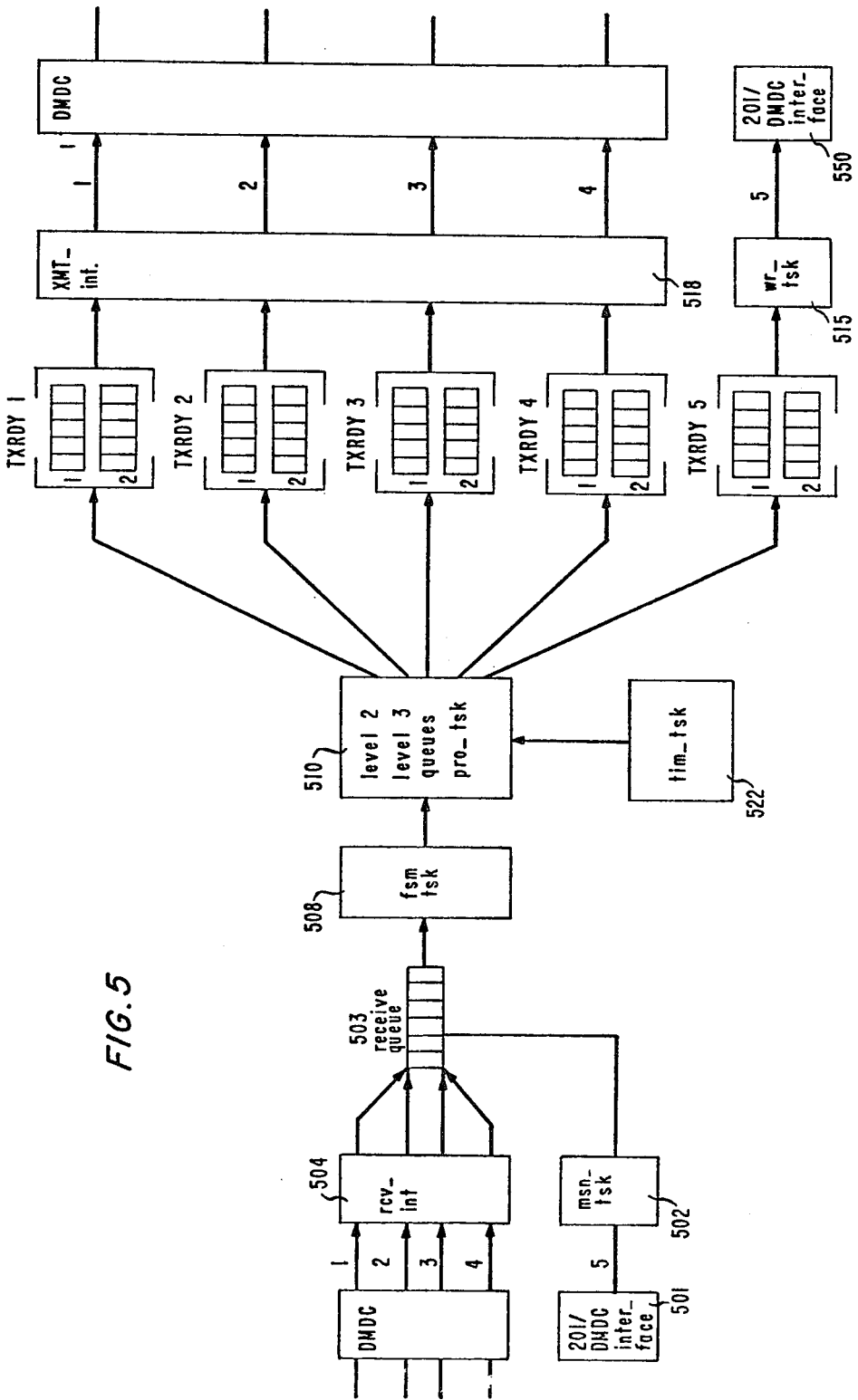
FIG. 5 shows frame flow-through within the DMDC at a node.

FIG. 5 illustrates the flow of message frames through a DMDC. During initialization of the DMDC, its buffer area is broken up into fixed-length buffers (FIG. 4) which are long enough to hold the longest message frame plus some header information for internal use of the DMDC software. A DMDC buffer area is an area of memory in the RAM of the DMDC. The buffer of FIG. 4 contains the message of FIG. 3 in its data area plus protocol and support information in bytes 0-25. Buffers are linked together to form a linked list of available buffers and are taken for use from the head of this list, filled with a received frame and replaced at the head of the list when the frame has left the DMDC. The operation is that of a linked stack.

An interPBX call message, formulated by call processing and service applications programs being processed in a PBX switch processor (201CC) and requiring access to a data link, is placed in a 201CC buffer (FIG. 3) by the 201/DMDC interface 501 after being prefixed by a session layer header. Interface 501 is part of the 201CC processor. Interface 501 implements the "session layer" of BX.25, but does not do any BX.25 level 3 protocol. The message buffer is placed in a 201CC port mail-box which is scanned by the 201CC message scan task (msn—tsk) 502 of the DMDC. The 201CC has two levels of port priority. The highest priority ports are scanned first. If msn—tsk 502 finds a message, a free DMDC buffer (FIG. 4) is obtained from the DMDC free buffer list and, if the flow control count of the network channel for that 201CC port is not exceeded, one packet of the message is read into the DMDC buffer. A packet is 128 bytes of data including the session layer. It may be less than or more than a message. Flow control maintains a count of the number of packets that have been sent out over a link without acknowledgement from the receiving end on that channel. The DMDC buffers containing message packets are entered into the received message queue 503 in the DMDC. Header information (FIG. 4, bytes 17-25) is added to this buffer to make the frame received from the 201CC look the same as a frame received from one of the DMDC links.

Likewise, frames received on the DMDC links of a PBX are deposited via DMA of the DMDC into fixed-length DMDC buffers (FIG. 4). When a full frame has been received, the DMDC is interrupted and the receive interrupt routine (rcv—int) 504 links the full buffer containing the receiving frame onto receive queue 503, gets a new empty buffer from the list of free buffers (not shown) and sets up the DMDC link to receive a new frame. Thus, queue 503 in the DMDC can receive frames from the 201CC processor (DMDC link 5) as well as from DMDC links 1-4.

The frame scan task (fsn—tsk) 508 of the DMDC looks at receive queue 503 and calls the protocol task (pro—tsk) 510 whenever fsn—tsk 508 finds a message frame in queue 503. If the received frame contains a data packet, header information (FIG. 4) in the buffer area associates this packet with a network channel. The protocol task (pro—tsk) 510 performs all the functions associated with the BX.25 level 3 protocol for both the incoming and outgoing logical channels associated with this network channel. This task also performs all BX.25 level 2 functions associated with both the incoming and outgoing links for the received frame in queue 503. As a result of protocol acknowledgements contained in the received frame (and/or the packet), one or more frames in one of queues TXRDY- may become free to transmit. This action is determined by the level 2 and 3 window sizes which define the number of unacknowledged frames and packets, respectively, that can be outstanding in a single queue TXRDY-. Frames which can be transmitted out over one of links 1-5 are linked onto the transmit queues TXRDY 1-5. Each time a frame is linked onto a transmit queue for a link 1-4, status of the link is checked. If the link is not transmitting for the lack of something to transmit, it is started by pro—tsk 510. If the transmit queue that received the frame is TXRDY 5 for the 201CC, the 201CC write task (wr—tsk) 515 is scheduled to write the packet into the 201CC memory.

Upon completion, pro—tsk 510 returns control to fsn—508. Fsn—tsk 508 looks at receive queue 503 again and, if this queue is not empty, the process repeats until queue 503 has no more received message frames.

The timing task (tim—tsk) 522 is scheduled every 100 milliseconds. This task implements the timing functions of the BX.25 protocol. If a timer times out, pro—tsk 510 takes the appropriate action, such as retransmitting a frame.

A DMDC interrupt is generated whenever a message is received on a link. The receive interrupt handler 504 is used for receive interrupts from the data links and determines which of the four data links generated the interrupt, reads the error status of the received frame, stores it in the frame buffer of FIG. 4 and links the frame buffer onto a queue 503 of received frames, obtains a new buffer from the queue of free buffers and sets up the DMA controller and data link to receive another frame on that link. A minimum level of free buffers is always maintained on the free buffer queue of the DMDC memory by not transmitting acknowledgements when buffers are below this minimum. This minimum is designed so that the receive interrupt should always be able to get a free buffer.

The transmit interrupt handler (xmt—int) 518 is used for transmit interrupts from the data links and determines which of the four data links generated the interrupt, reads the error status of the last transmitted frame and stores it in the frame buffer. If it is an information frame, transmit interrupt (xmt—int) 518 places it on a queue to await acknowledgement. If not, xmt—int 518 puts the buffer back on the free buffer list, determines the next frame to be transmitted, enters the BX.25 level 2 sequence number, and sets up the data link and the DMA controller to transmit that frame. Frames are selected from the transmit queue TXRDY- on a priority basis. Two levels of priority are provided. These are represented by the subqueues 1 and 2 in each queue TXRDY-. This permits priority treatment of selected messages. If no frame is to be transmitted, a bit in memory is set to indicate that the link is idle and checks all four links before returning from interrupt.

The 201CC wr—tsk 515 handles the transmission of a message from the DMDC buffer area (FIG. 4) to the 201CC buffer area (FIG. 3). When wr—tsk 515 gets control, it checks the transmit queue TXRDY 5 for the 201CC. If these queues are not empty, wr—tsk 515 writes the data from one DMDC frame buffer of TXRDY 5 to the 201CC memory. For long messages of more than one frame, wr—tsk 515 assembles the complete message in the 201CC memory prior to alerting the 201 DMDC interface 550.

DMDC TASK SCHEDULING

In the DMDC, the only work-producing task scheduled in background is msn—tsk 502. This task scans the 201CC looking for messages to be transmitted. In order to give msn—tsk 502 enough time, even in the presence of heavy traffic to the 201CC and between the links, it runs alternately with every other task, regardless of load. All other work (except maintenance), is produced by interrupts. Another feature of the scheduling structure is that acknowledgements of received frames are generated by a background task. If the DMDC is loading down to the point where switch processor 201CC does not have time to process the incoming message flow, acknowledgements will also be slowed down and a sending terminal, obeying the rules of the protocol, will have to slow down the sending rate.

This scheduling structure also provides for a transfer of real time between message handling and maintenance software based on load. At idle, all real time except that required to look for messages from the 201CC and handle protocol timers, is allocated to maintenance. Under traffic peaks, all real time except about 1% for required maintenance can be used for handling messages.

DATA STRUCTURES

FIG. 4 shows the message buffer layout for the 150 byte buffers used in the DMDC. SLDH is the session layer data header, and is used in communications between switch processor 201CC and any peripheral processor CP/A accessible over a DDL- data link. The DMDC takes the SLDH as part of the message itself. The level 3 header starts with the general format identifier (GFI) and also contains bytes for the destination logical channel number and the Packet Type Identifier (PTI). The level 2 header starts with the Address byte and also contains the Control byte which serves the same purpose in level 2 that the PTI serves in level 3. R0 and R1 are the low and high bytes of the message length, and RIC is the receiver interrupt return code that is obtained after reception of the frame from the HDLC chip. Qflags contains flags to indicate whether level 2 and level 3 protocol handlers have control of the buffer. The 201 Read Offset is the offset in the queue (in the memory, not shown, of switch processor 201CC) from which switch processor-originated messages are read. This offset may be used to confirm, to the message originator, the correct reception of the message by the message destination.

SWITCH PROCESSOR 201CC MESSAGE HANDLER (FIG. 9)

The DMDC at a PBX node receives a data link message which includes the trunk group number and trunk number of the call to which the message relates. The level 3 protocol handler (see 510, FIG. 5) of the DMDC determines from the header of a message received from queue 503 whether the message is for the 201CC switch processor or whether the DMDC is acting as a tandem point for data to another PBX. If the data is for the 201CC switch processor it is passed over the link 5 (FIG. 1) to interface 550 (FIG. 5). If the data message is for another PBX it will be passed to the xmt—int process 518, in which case the 201CC switch processor will be unaware of the message.

Figure 9:
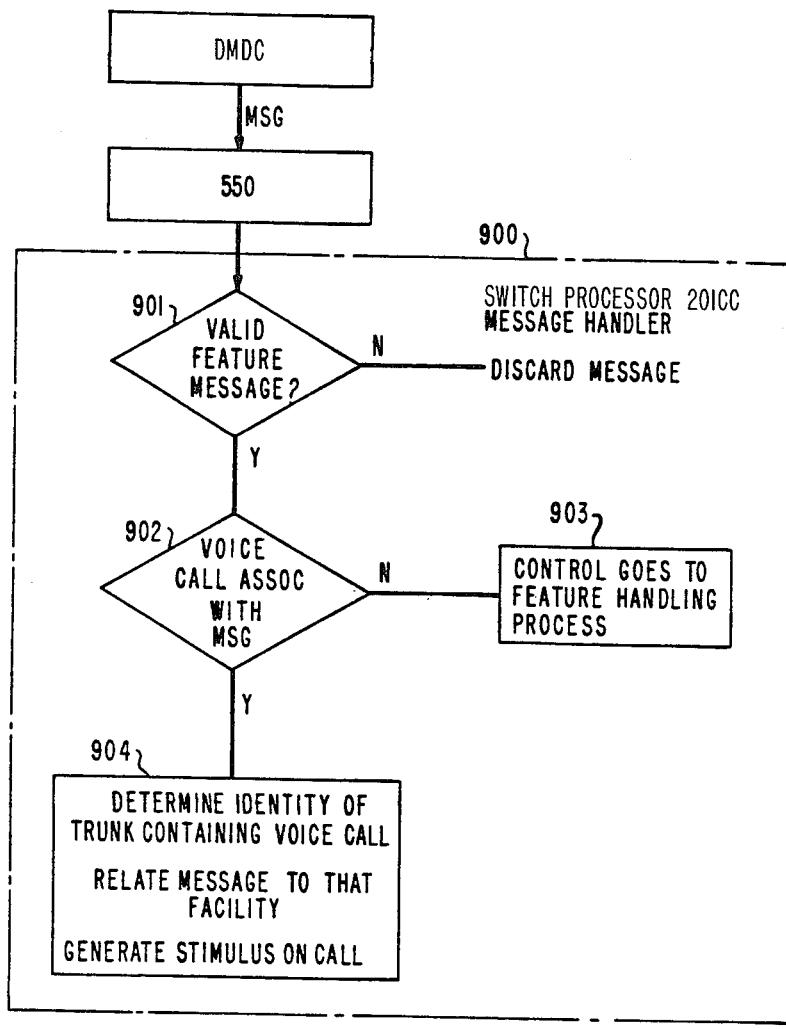
FIG. 9 shows the incoming data message handler at the switch processor at a PBX node.

Assuming the message is for the 201CC switch processor, it is delivered by interface 550 to 201CC switch processor message handler 900, FIG. 9, which examines the message in process 901 to determine whether the message is valid and passes control to process 902 to determine whether the message relates to an associated voice call or to a special feature. The first word of the message contains the number of the feature and the feature type and control is either passed to the feature handling process 903 or to the associate call handling process 904.

In process 904, the incoming message buffer address in the 201CC is stored in an incoming trunk record and a stimulus is generated for the trunk designated by number in the incoming message. If the stimulus is generated for an idle trunk, the data message has arrived before the arrival of the voice call. The trunk will be taken out of the idle condition and put in a special state to await the incoming voice call. If the voice call precedes the arrival of the data link message at the destination PBX, action on the stimulus may be deferred, to be handled later as the call proceeds to completion. If the data message is delayed beyond the point for which it is required by call processing, it is ignored and the call is served in the same manner as if the message was never received.

In a common routine, used by all incoming tie calls to allow the call to tandem or route to a local station, a check is made for the presence of a DMDC message. If one is present, the call is served in the appropriate manner.

To minimize the selection and holding of DMDC messages for which facilities may not be required for a given call, the selection of such facilities is delayed until after the digits dialed by the originating party have been translated to determine whether the terminating facility is located on the Local or on a Remote PBX. On an intraPBX call, no DMDC data message is required for the call. However, if the call is directed toward a Remote PBX, an appropriate data message is required to provide the proper ring rate, call wait alert tone, etc. to the station at the Remote PBX.

The proper DMDC message is generated based primarily on the source of the call. A 201CC message buffer in the originating PBX will be selected and a pointer to this buffer will be stored in a trunk record in the originating PBX. Source independent data such as feature number and type, local PBX number, dialed digits and a flag indicating call handling if the DMDC should fail are loaded into the 201CC message buffer. The rest of the buffer is filled per the call source and the outgoing data message is formatted in a message buffer sometime prior to its transmission to another PBX. The selection of a data channel for the message is intimately associated with the selection of the interPBX tie-trunk to be used in completing the call. For most interPBX tie-trunks there is an associated DMDC data channel. Selection of the outgoing tie-trunk will result in the selection of the data channel. When the specific trunk for the call is selected, the trunk group and index is entered in the message buffer associated with the call to receive special processing based on the type of message received. If the call is merely tandeming through this PBX, the incoming message received will be retransmitted to the next destination PBX when the trunk is selected in the same manner as an originating trunk call. The trunk group and index in the message will be changed to reflect the new trunk.

Outgoing message buffers are released as soon as the message is successfully sent. Feature applications release incoming buffers as soon as all pertinent information has been utilized.

NON-VOICE CALL DATA MESSAGE (903)

A non-voice call-related DMDC message will contain feature dependent information such as shown in FIG. 3. Arrival of these messages will cause a software process to be immediately initiated which will act on the information present.

BUSY VERIFICATION OF STATION LINES (BVSL) AND TRUNK VERIFICATION BY CUSTOMER (TVC)

These features allow the PBX attendant to bridge onto a station or trunk, respectively, to verify that they are functioning properly. Transparency of the busy verification and trunk verification by customer features enable an attendant to verify a station or trunk homing on a remote PBX in much the same manner as such service is currently implemented in DIMENSION PBXs for stations and trunks at the attendant PBX. Verification of remote facilities requires that information that identifies the related voice path call as a specific feature call and not a standard incoming tie-trunk call be furnished over the data links and the DMDC. The DMDC is additionally used to transmit lamp status information to/from the attendant site. Busy verification of a station line may be accomplished in two ways. The attendant can depress the verify key and dial a tie-trunk access code or press a direct trunk group select key. The verify key would then again be operated and upon receiving recall dial tone the attendant would dial the station number at the remote PBX. Optionally the attendant could simply dial a remote station number after pressing verify and the call will automatically route to the remote site.

Similarly, verification of a remote trunk may be accomplished in either of two ways. The attendant may depress "verify" followed by dialing a tie-trunk access code or may press a direct trunk group select key and then depress the verify key again. On receiving recall dial tone the attendant would dial the remote trunk dial access code and then the trunk index. Optionally, the attendant could have a direct trunk group select key associated with a remote trunk group and then dial the trunk index.

Implementation of the two push verify key operation basically is to detect the second verify operation at the attendant site and then transfer control to the remote site to collect the remaining digits, distinguish between station and trunk verification, and perform the verification process. When the second above-mentioned push verify key is detected, a tie-trunk in the group specified is seized and a DMDC verify request message is sent to the remote location. The attendant enters a wait state until a confirming DMDC message is received from the remote site. Due to the DMDC verify request message, the call is recognized as a verification call in the remote PBX immediately after inseizure of the trunk. The call is then handled by verification software which sends the confirmation message and sets up to collect additional digits from the attendant. The attendant is connected in a talk state when the confirming message is received and hears recall dial tone from the remote location over the trunk. The subsequently dialed digits are collected at the remote site and the call connection specified by the dialed digits is acted upon. The attendant hears call progress tones applied at the remote site.

When it is determined by originating PBX call processing software that the dialed station is remote, a DMDC message is set-up which includes the dialed station digits, and a decision is made as to whether the call must route through automatic routing AAR and appropriate routines are entered. The call enters a dialing state while digits are being sent out over the trunk. When the digits have been sent, the call will proceed to a talking state. Calls will be intercepted at the remote location when it is determined that the call is for a station at that location. This allows calls to tandem through a remote PBX when the called station is not in the remote PBX.

If a DMDC message is associated with the call, a branch will be made to a feature routine to handle the call. If no message has been received, the call must be treated in the remote as a normal trunk to station call. In this case the attendant will hear the progress of a normal tie-trunk to station call, i.e. may receive busy tone rather than be bridged onto a call. Given that a DMDC verify message is associated with the call, the remote PBX will return a confirming message and proceed immediately with the station verification. The attendant will hear the verification progress tones from the remote PBX. The verification routines in the remote are analogous to those currently existing for verify except they allow for linkage to a tie-trunk and not a switch loop.

For remote trunk verification, if a direct trunk group select key at the attendant site is associated with a remote trunk group then a DMDC message is set-up that contains the remote trunk dial access code as specified for the key. The trunk index digits dialed by the attendant are then collected and stored in the 201CC message buffer. The message is then sent, seizure of the tie-trunk to the remote PBX is started, and a wait state is entered. When the seizure sequence completes, a check is made for return of the confirming DMDC message. If it is not present, a 5 second timer is set and another wait state is entered. On time out the call is terminated at the attendant end. Otherwise, when the message is received the call is put in a talking state.

Verification of a remote facility will not be permitted if there is not a DMDC administered as part of the system, if a DMDC channel is not associated with the trunk group selected, or if the DMDC is non-functional so that a message cannot be successfully sent. The call will be terminated on reorder in the originating PBX. With the exception of the direct station dial case described above, the call in the attendant PBX will not be cut through to a talk state until a confirming message is received from the remote end that it recognizes this call as a verify. Should this reply not arrive, the call will be routed to reorder tone in the originating PBX.

Incoming DMDC messages for a trunk that already has an incoming 201CC message buffer associated with it will cause the old message to be discarded and the new message stored unless the "no override flag" is set. This flag is set when a commitment is made to a certain feature based on the currently stored message. From this point on, subsequent messages for the same facility will be discarded.

AUTOMATIC CIRCUIT ASSURANCE (ACA)

A trunk is considered to be defective by the ACA feature when the duration of a call over that trunk exceeds an administered long holding time value, or the number of calls over the trunk having a duration of less than the administered short holding time value exceeds a preassigned (non-administrative) level. Whenever either of the above two conditions is detected, the ACA feature creates an audit trail record containing information about the faulty trunk. In addition to the audit trail record, the customer can request to receive an ACA referral call to report a possibly faulty trunk at a specified attendant console. This call will be accompanied by an alphanumeric data display on the attendant console which will give information about the faulty trunk. The ACA referral call is generated internally and is not associated with a station, so is termed a "phantom" call.

If attendant service is centralized at one PBX (Centralized Attendant Service—CAS), each PBX in the corporate network cluster selecting the ACA feature and choosing to receive ACA referral calls can also choose to either have the calls generated at the local PBX or at the CAS PBX. The ACA feature is activated and deactivated by the attendant. To activate ACA, a switch loop key is depressed followed by the START key. The attendant is given dial tone. The ACA activation code is then entered, and if valid, confirmation tone is heard. Once activated, the measurement of call durations on trunk groups which have been assigned to the ACA feature begins. The same procedures are followed to deactivate the ACA feature, with the ACA deactivation code replacing the ACA activation code. If the CAS attendant activates or deactivates ACA in a cluster arrangement, a DMDC message will be broadcast to all PBXs in the cluster indicating that ACA is to be activated or deactivated. If a non-CAS attendant activates or deactivates ACA, the ACA feature will only be activated or deactivated at the local PBX.

If the ACA feature detects a defective trunk, an audit trail record is created at the local PBX containing information about the trunk. The creation of this audit trail record remains unchanged from the current procedure. The audit trail is always created at the PBX on which the faulty trunk homes.

If the local attendant, rather than the CAS attendant, receives the ACA referral calls from the local PBX, the normal processing procedure is followed which is to generate a phantom call and display a short or long referral type on the attendant console (short if the referral was caused by too many short calls, long if the referral was caused by one long call). The attendant answers the call by pressing the ANSWER key, which removes audible ringing. The attendant can then press the TRK ID key which will change the alphanumeric display on the console from the short or long referral type to the dial access code (DAC) of the trunk group which generated the referral. Another press of the TRK ID key will display the individual trunk number of the faulty trunk, and another press will redisplay the short or long referral type. Subsequent presses of the TRK ID key will cycle through the DAC, individual trunk number, and short or long referral type. The attendant can cancel the display by pressing the RELEASE key, or pressing a different switch loop key.

If the CAS attendant is to receive the ACA referral calls, a DMDC message will be sent from the PBX on which the faulty trunk homes to the CAS site. Upon receiving the message, the CAS PBX will generate a phantom referral call to the ACA attendant accompanied by an Incoming Call Identification (ICI) dislay of a tie-trunk between the two PBXs. The attendant answers the call by pressing the ANSWER or loop key, which removes audible ringing and changes the display to the short or long referral type. By pressing the TRK ID key, the display changes to the DAC of the trunk group containing the faulty trunk. Another press of the TRK ID key displays the individual trunk number of the faulty trunk. Subsequent presses of the TRK ID key will cycle through the short or long referral type, trunk group DAC, and individual trunk number. The attendant will never again be displayed the ICI of the tie-trunk between the two PBXs, so the attendant will have to be aware that the incoming trunk group ICI is not call-related if it is immediately replaced with the short or long ICI display. The ICI display is cancelled when the attendant presses the RELEASE key or a different switch loop key.

ATTENDANT CONTROL OF TRUNK GROUP ACCESS (ACTGA)

The ACTGA transparency feature allows an attendant at one PBX to control trunk groups which home on other (remote) PBXs in the corporate network in much the same way that control is activated for a local trunk group. Control of a remote trunk group is activated by dialing an ACTGA activation feature access code followed by pressing the direct trunk group select key for the trunk group to be controlled. Control is deactivated by dialing an ACTGA deactivation feature access code, followed by pressing the direct trunk group select key of the trunk group to have control removed. Since this is the same procedure used to activate or deactivate a local trunk group, checks are made to determine if the trunk group is remote or local to the PBX. If the trunk group is remote, a DMDC message is sent to the PBX on which the trunk group homes indicating that control is to be activated or deactivated. The request is verified (trunk group actually homes on the PBX and control is not already set to the condition requested), and if valid, control is set, the appropriate control lamp is turned on or off, and a confirmation DMDC message is returned to the PBX initiating the request. If the request is invalid, an error message is returned to the initiating PBX.

Upon receipt of a confirmation message, the appropriate control lamp is turned on or off at the attendant console. In addition, a DMDC message is broadcast to all PBXs in the DCS giving the new control status of the trunk group. Upon receipt of the broadcast message, each PBX determines if it has a direct trunk group select key for the trunk group, and if so, updates its lamp conditions appropriately.

Two conditions would result in an error message being returned to the originating PBX. An invalid dial access (DAC) will generate an error message, as well as an attempt to control a trunk group which is already controlled or an attempt to deactivate control of a trunk group which is not currently controlled. In the case of an invalid DAC, the attendant will receive intercept tone. In the case of the desired control matching the existing state of the trunk group, the state of the trunk group at the attendant's PBX will be updated to match the trunk group's state at the remote PBX. Again, a DMDC message is broadcast to all PBXs in the DCS giving the control status of the trunk group, and each PBX updates its lamp conditions appropriately.

If neither a confirmation nor error message is returned to the originating PBX within four seconds, the attendant receives reorder tone. Reorder tone indicates that facilities were not available to process the request, but that the attendant is free to retry the operation.

Outgoing calls over an attendant controlled trunk group are intercepted and routed to an attendant for processing. Each installation will decide which attendant is to receive the ACTGA intercepted calls (CAS or local) for each trunk group. The destination of any intercepted call is dependent on the administration of the trunk group. If CAS does not exist, the local attendant will automatically receive the ACTGA intercepted calls. Any call routed to an attendant other than a local attendant will be accompanied by a DMDC message. This message will contain information for the ACTGA alphanumeric display on the attendant console.

Due to the multiple combinations of CAS and local attendant arrangements, the following points should be made. The attendant initiating the trunk group control will not necessarily intercept the outgoing calls over that trunk group. Also, even though one attendant activates control of a trunk group, another attendant may deactivate that control. The attendants should be aware of these facts to minimize confusion.

The ACTGA transparency feature also indicates the monitoring of the Busy or Warning Lamps. If the number of active trunks in a trunk group exceeds the warning limit, the Warning Lamp for that trunk group lights. If all of the trunks in the trunk group are active, the Busy Lamp lights. The ACTGA transparency feature will modify this process so that if the busy or warning lamp status on a console is modified, and the trunk group affected can have a corresponding key assignment on another PBX console, a DMDC message will be broadcast to all PBXs giving the new busy or warning status of the trunk group. Each PBX will then determine if the message is relevant to itself, and update its lamps appropriately.

To ensure that the busy, warning, and control status of the direct trunk group select keys on all PBX consoles in a DCS remain synchronized, every 50 seconds each PBX will broadcast the status of one direct trunk group select key to all other PBXs in the DCS. After 20 minutes, all consoles will have been completely updated.

Control of trunk groups at remote PBXs will be activated or deactivated by dialing the appropriate feature access code, followed by pressing the appropriate direct trunk group select key. The DMDC data message sent to a remote PBX to activate/deactive trunk group control will contain the following information: call type (ACTGA), trunk group dial access code at the distant end, control status desired (on/off), and PBX number generating the request. The DMDC confirmation data message sent from a remote PBX to the PBX initiating control will contain the following information: call type (trunk group status message), number for the PBX from which the status change had been requested—0 if not known, and data for lighting the control status console lamps for that key. If the attendant presses the release key before receiving confirmation tone, the switch loop will be placed in a hold condition until either the confirmation message is received, or the timer has expired. If the switch loop is still active when the confirmation message is received, confirmation tone shall be added to the attendant's switch loop.

ALPHANUMERIC DISPLAY TO ATTENDANT

When an attendant becomes idle, the Incoming Call Identification (ICI) identifying the incoming trunk group will be displayed on the attendant console and the attendant alerted. For an intercepted call, the first ICI will be the intercept ICI information and the first operation of the Class of Service (COS) key will display the normal incoming trunk ICI. When the attendant operates the COS key on the console, the identity of the call originator (station # or trunk group ICI) will be displayed from the data received when the call was made. If the incoming call (remote call) was intercepted, the first operation of the COS key will display the incoming trunk group ICI. A subsequent operation of COS key will operate as described above. If the incoming trunk is identified as a trunk with an administered DMDC link, and some failure or delay prevented that data from being stored locally, a query message will be sent to the remote PBX requesting the call originator information. This data will automatically be displayed when it is received from the remote PBX. If this data is not received within 2 seconds a data error count for the data link will be pegged. Subsequent operations of the COS key during this 2 second period will be ignored. An operation of the COS key after the 2 second period will repeat the operations above.

A second operation of the COS key will display the station COS or the remote trunk index. Subsequent operations of the COS key shall result in alteration between the originator identity and the COS/trunk index.

Incoming calls from remote PBX's will have originating source information associated with them (in a DMDC message), and this information will be stored for use when the COS key is operated. If the associated DMDC message has not arrived when the call proceeds to call processing a query message will be sent to the remote PBX and a query reply message wait state entered. If the query response is received within 2 seconds then the information will be stored or used as necessary. Otherwise, the call will be handled as if the DMDC message was not required. Subsequent requests for information from a remote PBX by use of the COS key will generate additional query messages to be sent. When a query message is sent and the 2 second wait state entered, additional COS key operations within that 2 second wait state will be ignored.

AUTO CALLBACK (ACB)

A station user in one PBX may activate an automatic callback request toward a station in a remote PBX by dialing the feature access code followed by the remote station digits, or by the operation of a designated feature button on an electronic key telephone set (ECTS) following the receipt of a busy tone from the remote PBX, or by depression of the ECTS feature button followed by the dialing of the remote station code when originating a call to the station.

Figure 6:
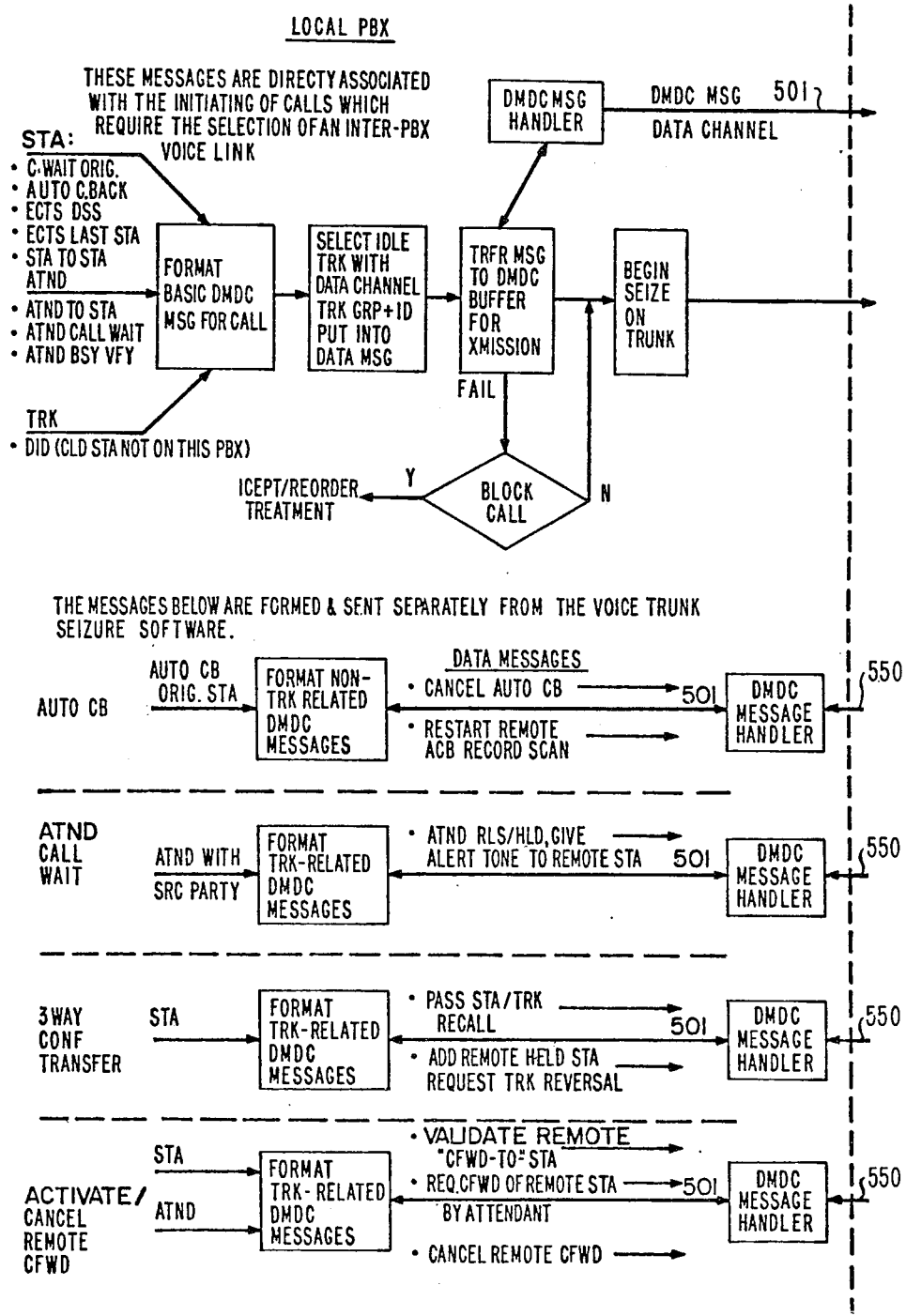
FIGS. 6 and 7, arranged as shown in FIG. 8, show the messages exchanged over a data link between PBX nodes to handle calls involving the selection of an associated tie-trunk (upper part of FIGS. 6 and 7) and messages exchanged incident to providing services not involving the selection of an associated tie-trunk.

On an initial request for this service on a call, an "Init_ACB" DMDC data message (FIG. 11) is formed and transmitted over a data channel to the remote PBX together with the initiation of an outgoing trunk seizure sequence in the originating PBX for a trunk to the remote PBX with which the data link is associated (see FIG. 6). If the callback request is valid, a confirmation tone is returned to the originating station from the distant PBX via the interPBX voice path. The originator then goes on-hook to activate the callback attempt.

The originating station on-hook results in a trunk disconnect signal at the remote PBX which puts the associated call record into a timing state and scans the called station for an idle condition. A DMDC data message "Confirm Activation" of FIG. 12 is sent to the originating PBX to confirm activation of the request. This data message does not require the seizure of a trunk path in order to be sent but employs the PBX identity code(s) of the originating PBX to select the data channel (see FIG. 7).

If the remote called station fails to go idle within an allowed interval such as 20-40 minutes, the callback is cancelled by software at the remote PBX and a "Cancel Auto CB at Originating PBX" DMDC data message of FIG. 12 is sent to the originating PBX to cancel the callback request there.

Figure 7:
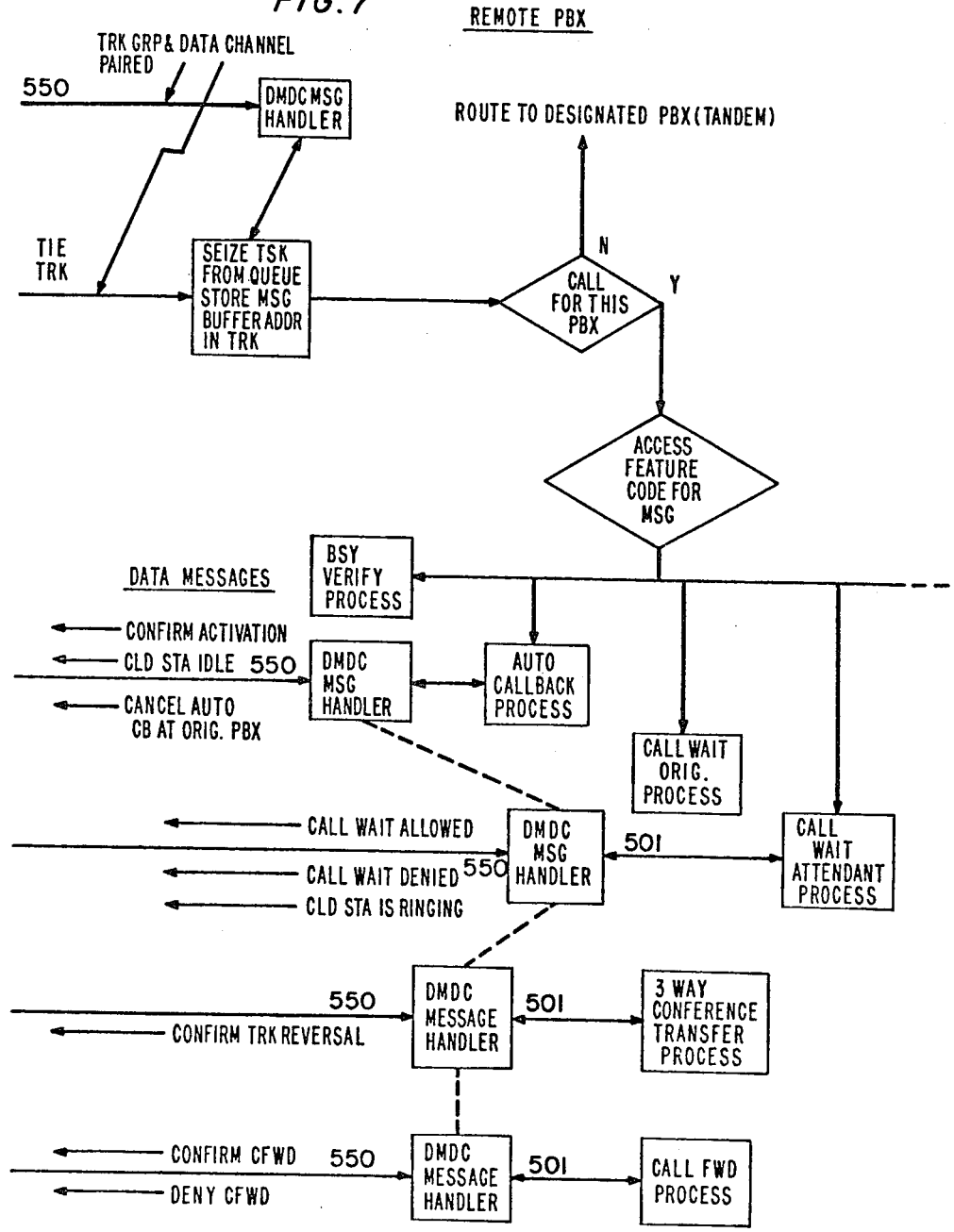
Figure 8:
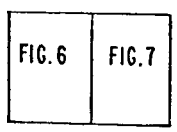

When the remote called station goes idle, a "Called Station Idle", DMDC data message of FIG. 12 is sent to the originating PBX and the called station is marked busy to incoming calls at the remote PBX (FIG. 7, lower portion).

Upon receipt of the "Called Station Idle" DMDC data message at the originating PBX, the originating station is checked for an idle status and a check is made for an idle interPBX voice path with associated data channel. If an idle path is found, the originating station is alerted with 3-burst ringing. Upon answer, a "RECALL_ACB" DMDC data message of FIG. 11 is generated and transmitted with a corresponding outgoing trunk seizure to ring the remote called stations (type 1 message as shown in the upper portion of FIG. 6). If the originating station fails to answer the 3-burst ringing within a defined time interval, the auto callback is torn down at the local PBX and a "Cancel Auto Callback" DMDC data message of FIG. 12 is sent to the remote PBX to release the auto callback records there (FIG. 6, lower portion).

If the calling station is not found idle and/or an idle interPBX voice path is not available within a preset time interval, the call will be "put to sleep" until such an idle condition is met. At that time, a "Restart Remote ACB Scan" DMDC data message (FIG. 12) is sent to the remote PBX to again scan the remote ACB record to find the called station idle when a "Called Station Idle" DMDC (FIG. 12) is again formed and sent as described above.

A station user may request deactivation of an auto callback by dialing the appropriate feature access code which will cancel the callback at the originating PBX and send a "Cancel Auto Callback" DMDC data message of FIG. 12 to remove the callback at the remote PBX as described above.

Implementation of the automatic callback feature toward a remote station is accomplished by splitting the call record used in the single PBX case into two callback records, one in the originating PBX and the other in the distant PBX. The record in the originating PBX is used to keep track of the callback originator's state while the record in the distant PBX is used to maintain control of the called station's state.

To deny the automatic callback feature to remote stations which reside outside the corporate network of PBX nodes, the call is intercepted at the PBX where the forwarding takes place, if a callback is attempted toward a station which has activated Call Forward-All Calls toward a central office.

CALL WAITING ORIGINATING

Call Wait Originating feature transparency is provided by a single DMDC data message as shown in FIG. 13. The message is a type 1 message which is transmitted together with the seizure of the interPBX tie-trunk circuit for the audio portion of the call. The message provides an indication to the remote PBX that the incoming call is a Call Wait Originating request and a 3-burst ring is to be applied to the called station, if idle, else 3-burst call wait alert tone will be applied to the called station, if busy in a call (and the state is one which allows call waiting). This message is transmitted as shown in the upper left portion of FIG. 6.

DISTINCTIVE RINGING

Distinctive Ringing features transparency for attendant, trunk, or station origination to remote PBX stations is achieved by transmitting a basic type 1 DMDC data message from the originating to the remote PBX. This message is sent together with the initiation of the seizure sequence on the outgoing tie-trunk. The message is shown in FIG. 14 and is of the type shown in FIG. 6, upper left. The call source, as determined from the message, causes the appropriate number of rings to be applied.

ATTENDANT CALL WAITING

Attendant Call Wait feature transparency is provided by DMDC data messages. When an incoming call is completed to a remote station, the request is transmitted in the form of an "Initiate Attendant Assisted Call" DMDC data message as shown in FIG. 15. This is a type 1 message which is transmitted together with a seizure request on the outgoing interPBX voice path (tie-trunk). (see FIG. 6, upper left portion.)

The remote PBX processes the request and transmits a return DMDC data message, "Call Wait Allowed" (if the called station is busy) (FIG. 16), or "Call Wait Denied" dependent upon whether call waiting is permitted or not at the remote called station. These response messages are transmitted by selecting the data channel associated with the interPBX trunk path. They are a modified type 2 message (i.e. a trunk seizure is not being made in conjunction with the transmission of the message). (See FIG. 7, lower right-hand side.)

The call wait alert tone is applied to the busy called station at the remote PBX when the attendant releases from the call. This results in a "Give Alert Tone to Remote Station" (FIG. 17) DMDC data message. This is also a modified type 2 message.

When the remote called station goes idle, ringing is applied and a "Called Station Ringing" DMDC data message similar to FIG. 16 is sent to the originating PBX to update the status of the lamps in the attendant console. This modified type 2 message is shown in FIGS. 15, 16, and 17.

It should be understood that the description of the illustrative embodiment in terms of permanent virtual circuits established through logical channels defined in the DDL- data links between PBX nodes is merely exemplary and that it may be preferable in certain installations to use virtual call data transmission or datagram messages with appropriate modification to the DMDC software and the message format in the data link.

With the virtual call implementation, network channels would be set-up dynamically through the DMDC at initialization time by the exchange of session connect messages and call connect packets as described in the BX.25 specification.

Using a datagram-like network, ports in the switch processor would be associated with destination nodes. Individual packets would be routed based on a destination header placed in the packet at its source.

Combinations of the permanent virtual circuit, virtual call and datagram network could also be implemented.

Further and other modifications will be apparent to those skilled in the art without however deviating from the spirit and scope of our invention. For example, the data network and the voice network need not be physically separate facilities. If desired, they could be separate virtual channels of a single multiplexed facility. They could also be different time multiplexed frames of a time shared path such as a T1 carrier.

What is claimed is:

1. Apparatus for according station and attendant feature transparency among a plurality of PBX switching nodes each having a switch processor serving a respective plurality of station lines and trunks and further having data links means for communicating with neighbor nodes, comprising at one said PBX node;

data link control means (510, TXRDY 1-5) for defining a plurality of logical channels in said data link means, means (502, 503, 508) for selectively connecting said switch processor at said node to at least one of said plurality of logical channels, and means (503, 508, 510) for connecting another of said plurality of logical channels selectively either to said switch processor or to a further one of said plurality of logical channels whereby feature related messages incoming to said one node from one of said other nodes may be processed by said switch processor at said one node to complete a connection for a call feature to be locally provided at said node or may be forwarded transparently to one of said neighbor nodes for completion of a feature related connection thereat.

2. Apparatus according to claim 1 wherein said means for connecting said another of said plurality of logical channels selectively either to said switch processor or to a further one of said plurality of logical channels includes means (504) independent of said switch processor for reading a message arriving over one of said data links from another said node.

3. Apparatus according to claim 1 further comprising means at said switch processor for receiving call signaling information and forwarding said information to one of said plurality of logical channels for transmission to another said node.

4. Apparatus for permitting a switch processor at one PBX node to access a switch processor at any of a plurality of other PBX nodes interconnectable by tie-trunks and data links, comprising:

data link control means at each said PBX node including means for defining a plurality of logical channels on said data links, means controlled by said switch processor of a node for selecting one of said logical channels extending to a predeterminable group of said plurality of PBX nodes, and means for selectively connecting a switch processor in at least one of said PBX nodes to said selected logical channels whereby transparently to receive and forward station and attendant feature related messages to be processed by a distant node and locally to process other messages remaining.

5. Apparatus according to claim 4 wherein said means for selectively connecting a switch processor to said logical channels comprises direct memory access means.

6. Apparatus according to claim 4 wherein a switch processor of at least one of said PBX nodes includes means for formulating a message identifying one of said tie-trunks extending to one of said plurality of other nodes and for forwarding said identifying message to said means for selectively connecting said switch processor to said logical channels for transmission to another node.

7. Apparatus according to claim 6 in combination with means for transmitting said identifying message to said another node over one of said logical channels, and wherein said switch processor of said another node includes call record means and means responsive to the receipt over said one logical channel of said transmitted identifying message for entering data from said received message into said call record means associated with said identified one of said tie-trunks.

8. Apparatus according to claim 7 wherein said switch processor of claim 6 and said switch processor of claim 8 are located at different ones of said plurality of PBX nodes interconnected by one of said tie-trunks.

9. Apparatus according to claim 4 wherein said last named switch processor includes means for formulating a message during one phase of a call identifying one of said trunks and for receiving a message during a subsequent phase of said call lacking association to any of said plurality of trunks.

10. A method for serving calls in a system comprising a plurality of switching nodes interconnectable by a data network and a voice path network, said method comprising the steps of:

(1) determining on a call initiation from a calling station in a first node whether any additional service is required on an internode call above and beyond the establishment of a call connection from said calling station to a called station in a second node, (2) establishing a voice path connection over said voice network from said calling station to said second node solely in response to an identification of the called station and independent of the additional service required, (3) transmitting a number identifying said called station over said voice path extending from said first node to said second node, (4) transmitting a data message over said data network from said first to said second node specifying the additional service required on said internode call, (5) extending said established voice path connection to said called station in said second node in response to the reception of said called station number over said voice path, and (6) providing said additional service during the serving of said call in response to the receipt of said data message by said second node.

11. The method of claim 10 wherein said voice path connection to said called station is established independent of the receipt of said data message by said second node.

12. The method of claim 11 wherein said voice path connection to said called station is established without the provision of said additional service on said call if said data message is not received by said second node.

13. The method of claim 12 wherein said voice path connection to said called station is established without the provision of said additional service on said call if said data message is not received in said second node within a predetermined time interval following the reception of said called station number by said second node.

14. The method of claim 11 in combination with the additional steps of:
(1) storing the transmitted called station number in a call record at said second node,
(2) storing the transmitted data message in said call record,
(3) reading the called station number out of said call record to extend said voice path to said called station, and
(4) reading said data message out of said call record to provide said additional service in connection with the extension of said voice path to said called station.

15. The method of claim 11 in combination with the additional steps of:
(1) storing the number identifying said called station in a call record at said second node with said record having space to store a transmitted data message,
(2) determining the absence of a data message in said call record and
(3) serving said call without the provision of said additional service by reading the called station number out of said call record to extend said voice path to said called station.

16. The method of claim 10 including the step of providing said additional service in such a manner that the call is indistinguishable to a user at said calling and called stations from an intranode call requiring the same additional service.

17. A method for serving calls in a system comprising a plurality of PBX's which are interconnectable by a data network and a voice path network, said method comprising the steps of:
(1) detecting the initiation of a call at a calling station in a first PBX,
(2) determining the identity of a called station from the digits dialed at said calling station,
(3) determining that the serving of said call requires the establishment of a voice path connection from said calling station to a station in a second PBX,
(4) determining whether any additional service is required on said call above and beyond the establishment of a voice path connection from said calling station in said first PBX to said station in said second PBX,
(5) establishing a voice path connection from said calling station over a path including a trunk of said voice path network extending from said first to said second PBX solely in response to the said first named determination and independent of whether any additional service is required,
(6) transmitting a number identifying said station in said second PBX over said voice path extending via said trunk from said first to said second PBX,
(7) transmitting a data message over said data network from said first to said second PBX specifying any additional service required on said interPBX call, said message containing an identification of the trunk serving the voice path connection for said call,
(8) extending said voice path connection to said station in said second PBX in response to the reception of said station number over said voice path, and
(9) providing the additional service required on said call in response to the reception of said data message at said second PBX.

18. A method for serving calls in a system comprising a plurality of PBX's, said method comprising the steps of:
(1) detecting the initiation of a call at a calling station in a first PBX,
(2) determining the identity of a called station from digits dialed at said calling station,
(3) determining that a call connection cannot be established to said called station identified by said dialed digits and that the serving of said call requires the establishment of a voice path connection from said calling station to a station in a second PBX,
(4) determining whether any additional service is required on said call above and beyond the establishment of a voice path connection from said calling station in said first PBX to said station in said second PBX,
(5) establishing a voice path connection from said calling station over a path including a trunk extending from said first to said second PBX solely in response to the said first named determination and independent of whether any additional service is required,
(6) transmitting a number identifying said station in said second PBX over said voice path extending via said trunk from said first to said second PBX,
(7) transmitting a data message over a data network from said first to said second PBX specifying any additional service required on said call, said message containing an identification of said trunk serving said call,
(8) extending said voice path connection to said station in said second PBX in response to the reception of said station number over said voice path, and
(9) providing the additional service required on said call in response to the reception of said data message at said second PBX.

19. The method of claim 17 or 18 wherein said voice path connection to said station in said second PBX is established independent of the receipt of said data message by said second PBX.

20. The method of claim 19 wherein said voice path connection to said station in said second PBX is established without the provision of said additional service on said call if said data message is not received by said second PBX.

21. The method of claim 19 wherein said voice path connection to said station in said second PBX is established without the provision of said additional service on said call if said data message is not received in said second PBX within a predetermined time interval following the reception of said station number by said second PBX.

22. The method of claim 19 in combination with the additional steps of:
(1) providing a call record unique to each trunk incoming to said second PBX,
(2) storing the transmitted station number in the call record unique to the trunk serving said call,
(3) storing the transmitted data message in said call record unique to said trunk as determined by the trunk identified in said data message,
(4) reading said station number out of said call record to extend said voice path to said station in said second PBX, and
(5) reading said data message out of said call record to provide said additional service in connection with the extension of said voice path to said last named station.

23. The method of claim 19 in combination with the additional steps of:
(1) providing a call record unique to each trunk incoming to said second PBX with each call record having space to store a transmitted station number and a transmitted data message,
(2) storing the transmitted station number in the call record unique to the trunk serving said call,
(3) determining the absence of a data message in said call record, and
(4) serving said call without the provision of said additional service by reading the station number out of said call record to extend said voice path to said station.

24. The method of claim 17 or 18 including the step of providing said additional service in such a manner that the call is indistinguishable to a user at a calling station as well as at said station in said second PBX from an intraPBX call requiring the same additional service.

25. The method of claim 18 wherein said data network interconnects said plurality of PBX's and has a plurality of data links extending from each of said PBX's to others of said PBX's in such a manner that each PBX is connectable to each other PBX either by a direct data link or by an indirect data link path comprising a first data link extending to an intermediate PBX and a second data link extending from the intermediate PBX to the other PBX, said method further comprising the steps of:
(1) transmitting said message over a data link directly from said first to said second PBX provided a direct data link interconnects said first and second PBX's or
(2) transmitting said message from said first PBX over a first data link to an intermediate PBX and then over a second data link to said second PBX when said first and second PBX's are not connected by a direct data link.

26. The method of claim 25 wherein each PBX includes a switch processor and a data link control unit having a data link control processor, said method further including the steps of:
(1) transmitting call information from the switch processor of a calling PBX to the data link control processor of said calling PBX on each interPBX call requiring said additional service and
(2) generating said data message in said data link control processor for transmission over said data network to said other PBX.

27. The method of claim 26 in combination with the additional steps of:
(1) operating said data link control processor at said intermediate PBX to receive a data message transmitted from said first PBX over said data network to said intermediate PBX,
(2) operating said data link control processor exclusive of said switch processor in said intermediate PBX to alter data contained in said received message, and
(3) operating said data link control processor to transmit said altered message over said data link network from said intermediate PBX to said other PBX.

28. The method of claim 26 wherin each PBX includes a memory accessible to both said switch processor and said data link control processor of said PBX, said method further comprising the steps of:
(1) transmitting call information from said switch processor to said data link control processor of a PBX by writing information from said switch processor into said memory and by reading said information out of said memory into said data link control processor and
(2) transmitting received call information from said data link control processor to said switch processor of a PBX by writing said information from said data link control processor into said memory and by reading said information out of said memory into said switch processor.

29. The method of claim 26 wherein each PBX includes a DMA (Direct Memory Access) controller including an address register, said method further comprising the steps of:
(1) transferring call information from said data link control processor to said switch processor by writing information into said memory under control of address information applied by said data link control processor to said address register and by then applying the information written into said memory to said switch processor and
(2) transferring information from said switch processor to said data link control processor by operating said data link control processor to read said memory under control of said address information applied by said data link control processor to said address register and in turn to said memory.

30. The method of claim 10 or 18 in combination with the additional steps of:
   (1) detecting a subsequent request for further service by a station connected to said call following said call establishment,
   (2) generating a subsequent request message in the node or PBX in which said subsequent request is made,
   (3) transmitting said subsequent request message over said data network to all other nodes or PBX's connected on said call, and
   (4) completing in each node or PBX receiving said subsequent request message the action specified by said subsequent request message.

31. The method of claim 30 wherein the requested action is the establishment of a three way conference connection.

32. The method of claim 10 or 18 in combination with the additional steps of:
   (1) generating an initial message in a first node or PBX prior to the initiation of said call,
   (2) transmitting said initial message over said data network to a second node or PBX involved on a call connection to be subsequently established,
   (3) checking the status of call serving facilities in said second node or PBX as specified in said initial message received by said second node or PBX, and
   (4) transmitting a message back to said first node or PBX indicating the status of said call serving facilities in said second node or PBX.

33. The method of claim 32 wherein the transmitted message to said second node or PBX is a request for call forward don't answer service to a station in said second node or PBX when a station in said first node or PBX does not answer.

34. In combination with a plurality of switching nodes each interconnectable by a voice path network and a data network,
   means for transmitting a called station number from a first node over said voice path network to a second node for establishing a voice path call connecting between a calling station in said first node and a called station in said second node,
   means for transmitting over said data network to said second node feature information required by said second node for providing additional service required on said call above and beyond the establishment of said call connection, and
   means in said second node responsive to the reception of said called number and said feature information for serving said call by establishing a connection to said called station in such a manner that said call is indistinguishable to users at said calling and called stations from an intranode call requiring the same additional service.

35. In a system comprising a plurality of PBX's interconnectable by a data network and a voice path network;
   means for determining on a call initiation from a calling station in a first PBX whether any additional service is required on an interPBX call above and beyond the establishment of a call connection from said calling station to a called station in a second PBX,
   means for establishing a voice path connection over said voice network from said calling station to said second PBX solely in response to an identification of the called station and independent of whether any additional service is required,
   means for transmitting the number of said called station over said voice path extending from said calling station to said second PBX,
   means for transmitting a data message over said data network from said first to said second PBX specifying the additional service required on said interPBX call,
   means for extending said voice path connection to said called station in said second PBX in response to the reception of said called station number over said voice path, and
   means for providing said additional service during the serving of said call in response to the receipt of said data message by said second PBX.

36. The system of claim 35 wherein said extending means completes said voice path connection to said called station independent of the receipt of said data message by said second PBX.

37. The system of claim 36 wherein said voice path connection to said called station is established without the provision of said additional service on said call if said data message is not received in said second PBX within a predetermined time interval following the reception of said called station number by said second PBX.

38. The system of claim 36 in combination with;
   means for storing the transmitted called station number in a call record at said second PBX,
   means for storing the transmitted data message in said call record,
   means for reading the called station number out of said call record to extend said voice path to said called station, and
   means for reading said data message out of said call record to provide said additional service in connection with the extension of said voice path to said called station.

39. The system of claim 38 in combination with;
   means for determining the absence of a data message in said call record and
   means for serving said call without the provision of said additional service by reading the called station number out of said call record to extend said voice path to said called station.

40. The system of claim 35 wherein said providing means provides said additional service to a user at said calling and called stations in a manner that is indistinguishable from an intraPBX call requiring the same additional service.

41. In a system comprising a plurality of PBX's:
   means for detecting the initiation of a call at a calling station in a first PBX,
   means for determining the identify of a called station from digits dialed at said calling station identifying said called station,
   means for determining that a call connection cannot be established to said called station and that the serving of said call requires the establishment of a voice path connection from said calling station to a station in a second PBX,
   means for determining whether any additional service is required on said call above and beyond the establishment of a voice path connection from said calling station in said first PBX to said station in said second PBX, means for establishing a voice path connection from said calling station over a path including a trunk extending from said first to said second PBX solely in response to the said first named determination and independent of whether any additional service is required, means for transmitting a number identifying said station in said second PBX over said voice path extending via said trunk from said first to said second PBX, means for transmitting a data message over a data network from said first to said second PBX specifying the additional service required on said call, said message containing an identification of said trunk serving said call, means for extending said voice path connection to said station in said second PBX in response to the reception of said station number over said voice path and independent of the receipt of said data message, and means for providing the additional service required on said call in response to the reception of said data message at said second PBX.

42. The system of claim 41 wherein said voice path connection to said station in said second PBX is established without the provision of said additional service on said call if said data message is not received by said second PBX.

43. The network of claim 41 in combination with;
means for providing a call record unique to each trunk incoming to said second PBX,
means for storing the transmitted station number in the call record unique to the trunk serving said call,
means for storing the transmitted data message in said call record unique to said trunk as determined by the trunk identified in said data message,
means for reading said station number out of said call record to extend said voice path to said station in said second PBX, and
means for reading said data message out of said call record to provide said additional service in connection with the extension of said voice path to said last named station.

44. The method of claim 43 in combination with;
means for determining the absence of a data message in said call record and
means for serving said call without the provision of said additional service by reading the station number out of said call record to extend said voice path to said station.

45. The system of claim 41 wherein said additional service is provided in such a manner that the call is indistinguishable to a user at a calling station as well as at said station in said second PBX from an intraPBX call requiring the same additional service.

46. The system of claim 41 wherein said plurality of PBX's are interconnectable by a voice path network and a data network having a plurality of data links extending from each of said PBX's to others of said PBX's in such a manner that each PBX is connected to each other PBX either by a direct data link or by an indirect data link path comprising a first data link extending to an intermediate PBX and a second data link extending from the intermediate PBX to the other PBX, said network further comprising:
means for transmitting said message over a data link directly from said first to said second PBX provided a direct data link interconnects said first and second PBX's and
means for transmitting said message over a first data link to an intermediate PBX and then over a second data link to said second PBX when said first and second PBX's are not connected by a direct data link.

* * * * *